United States Patent
Ino

(10) Patent No.: US 7,193,677 B2
(45) Date of Patent: Mar. 20, 2007

(54) DISPLAY DEVICE AND PORTABLE TERMINAL DEVICE USING THE SAME

(75) Inventor: Masumitsu Ino, Kanagawa (JP)

(73) Assignee: Sony Corporation (JP)

( * ) Notice: Subject to any disclaimer, the term of this patent is extended or adjusted under 35 U.S.C. 154(b) by 51 days.

(21) Appl. No.: 10/049,052

(22) PCT Filed: Jun. 7, 2001

(86) PCT No.: PCT/JP01/04815

§ 371 (c)(1),
(2), (4) Date: May 31, 2002

(87) PCT Pub. No.: WO01/95298

PCT Pub. Date: Dec. 13, 2001

(65) Prior Publication Data

US 2003/0112403 A1 Jun. 19, 2003

(30) Foreign Application Priority Data

Jun. 8, 2000 (JP) .......................... P2000-171700

(51) Int. Cl.
*G02F 1/1345* (2006.01)
(52) U.S. Cl. .................. 349/149; 349/151; 349/152
(58) Field of Classification Search .................. 349/43, 349/149–153, 71
See application file for complete search history.

(56) References Cited

U.S. PATENT DOCUMENTS

| | | | |
|---|---|---|---|
| 4,394,067 A * | 7/1983 | Spruijt et al. ................ | 349/153 |
| 4,643,526 A * | 2/1987 | Watanabe et al. ........... | 349/151 |
| 5,453,858 A | 9/1995 | Yamazaki | |
| 5,953,003 A * | 9/1999 | Kwon et al. ................. | 345/204 |
| 5,994,174 A | 11/1999 | Carey et al. | |
| 6,040,827 A * | 3/2000 | Shiina et al. ................ | 345/208 |
| 6,091,475 A * | 7/2000 | Ogino et al. ................. | 349/149 |
| 6,359,502 B1* | 3/2002 | Endou ......................... | 327/545 |
| 6,388,652 B1* | 5/2002 | Yamazaki et al. ............. | 345/98 |
| 6,576,926 B1* | 6/2003 | Yamazaki et al. ............. | 257/66 |

FOREIGN PATENT DOCUMENTS

| | | |
|---|---|---|
| EP | 0 903 722 A2 * | 9/1998 |
| JP | 11-84425 | 3/1999 |
| JP | 11-265155 | 9/1999 |
| JP | 11-352516 | 12/1999 |

OTHER PUBLICATIONS

Supplemental EPO Search Report mailed Apr. 27, 2005.

* cited by examiner

*Primary Examiner*—Thoi V. Duong
(74) *Attorney, Agent, or Firm*—Rader Fishman & Grauer PLLC; Ronald P. Kananen

(57) ABSTRACT

The present invention provides a display device. The display device comprises a first substrate having formed thereon a pixel section (12) in which a plurality of pixels (11) are arranged in a matrix form and driving systems (13, 14) for driving to write pixel signals to the pixel section (12), a second substrate arranged to face the first substrate, and a liquid crystal layer held between these substrates. As control systems (23, 24, 25) for controlling the driving systems (13, 14) are mounted as semiconductor chips on the first substrate in a COG method, reducing the thickness of the whole device is realized.

21 Claims, 9 Drawing Sheets

DISPLAY DEVICE AND PORTABLE TERMINAL DEVICE USING THE SAME

TECHNICAL FIELD

The present invention relates to a display device and a portable terminal device using the display device, and more specifically relates to a display device such as a liquid crystal display (LCD), an electroluminescence (EL) display, etc. and a portable terminal device using the display device as a display unit.

BACKGROUND ART

A panel display that is thin in the thickness and low in the power consumption is widely used as a display device for a television receiver, a computer, a portable terminal and so on. As such a panel display device, there is known an active matrix type display device which has a transparent insulating substrate (panel) such as a glass substrate and a number of pixels arranged thereon forming a matrix which use a thin film transistor (TFT) as a switching element, and is combined with a material having electro-optical effect such as liquid crystal, electroluminescence, etc.

As the active matrix type display device is known a liquid crystal display device in which at least a part of peripheral circuits formed on a substrate to drive a pixel section is composed of a complementary type TFT similar to an active element connected to each pixel, and the other part of the peripheral circuits is composed of semiconductor chips (Refer to Japanese patent laid-open H4-242724).

The liquid crystal display device disclosed in the above laid-open patent application includes a transparent insulating substrate 102 which has formed on its one surface a part of a peripheral circuit 101, a transparent insulating substrate (facing substrate) 103 which faces the substrate 102, and a liquid crystal layer 104 held therebetween, as shown in FIG. 12. In this liquid crystal display device, another peripheral circuit composed of a semiconductor chip, which is an IC chip 105, is arranged on the other surface of the transparent insulating substrate 102 such that the peripheral circuit 101 and the IC chip 105 are located on the opposite surfaces of the transparent insulating substrate 102. The IC chip 105 is electrically connected to the peripheral circuit 101 by using a flexible cable 106.

As is apparent in FIG. 12, in the liquid crystal display device having such a configuration, the thickness tb of the whole liquid crystal display device undesirably becomes large by the thickness ta (e.g., about 1 mm) of the IC chip 105 and the flexible cable 106. Accordingly, the thickness of an apparatus which uses the liquid crystal display device as a display section also undesirably becomes large. It is desired, particularly in a portable terminal device such as a portable telephone, to reduce the thickness of the device itself. Thus, the large thickness tb of the liquid crystal display device prevents the portable telephone itself which uses the liquid crystal display device as a display section from being reduced in thickness.

DISCLOSURE OF THE INVENTION

Accordingly, the present invention has an object to overcome the above-mentioned drawbacks of the prior art by providing a display device capable of reducing the thickness of a whole apparatus, and a portable terminal using the device.

The present invention provides a display device comprising a first substrate having formed thereon a pixel section in which a plurality of pixels are arranged in a matrix form and a driving system for writing pixel signals to the pixel section, a second substrate arranged to face the first substrate maintaining a predetermined space therefrom, and a material layer held between the first substrate and the second substrate to generate electro-optical effects, wherein the first substrate has formed thereon a control system being a semiconductor chip for controlling the driving system.

In the display device and a portable terminal device using the same according to the present invention, since the semiconductor chip, as the control system for controlling the driving system, is formed on the substrate on which the driving system is formed, the thickness of the whole display device does not depend on the thickness of the semiconductor chip. Thus, it can be realized to reduce the thickness of the whole display device and also to reduce the thickness of the portable terminal that uses the device as a display section.

Other objects and advantages of the present invention will become apparent from the following description of the preferred embodiments and the claims.

BRIEF DESCRIPTION OF THE DRAWINGS

FIG. 4A shows one having a bottom gate structure, and FIG. 4B is one having a top gate structure.

BEST MODE FOR CARRYING OUT THE INVENTION

A liquid crystal display device according to the present invention and a portable terminal device using the same will now be described with reference to the drawings.

Figure 1:
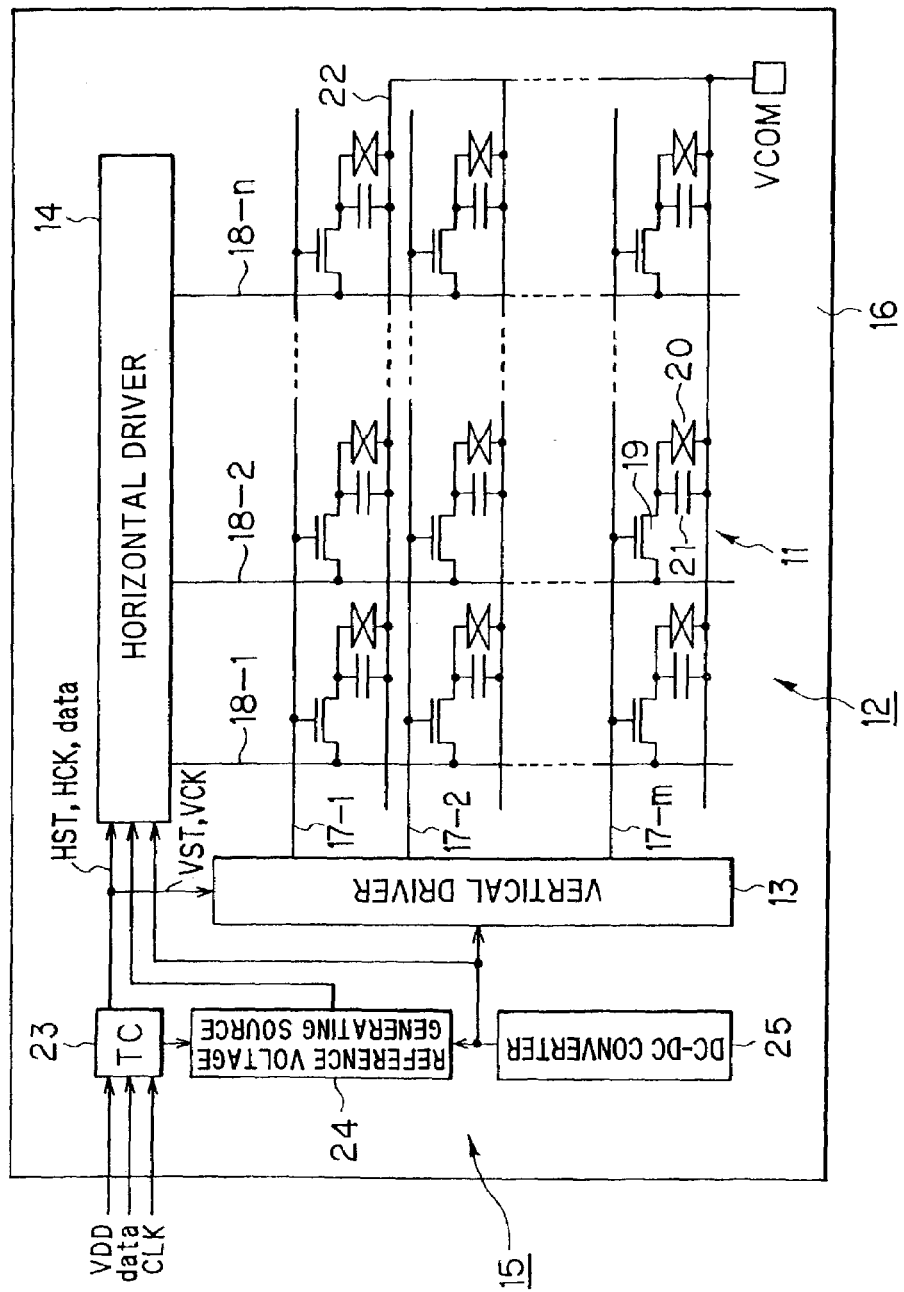
FIG. 1 is a block circuit diagram showing an embodiment of a liquid crystal display device according to the present invention.

An embodiment is explained in which the present invention is applied to an active matrix type liquid crystal display device in an analog point sequential driving system. This liquid crystal display device has a pixel section (effective pixel area) 12 structured by arranging a number of pixels 11 in a matrix form, a vertical driver 13 which sequentially selects each of the pixels 11 of the pixel section 12 on the line basis, a horizontal driver 14 which writes pixel signals on each pixel 11 selected on the line basis, a control system 15 which controls the drivers 13 and 14, and an LCD panel 16 having formed thereon the pixel section 12, drivers 13 and 14, and control system 15, as shown in FIG. 1.

The LCD panel 16 has two transparent insulating substrates (e.g., glass substrates), and a liquid crystal layer held between the two substrates facing to each other at a predetermined interval. In the pixel section 12 formed on one of the two substrates, gate lines (vertical selecting line) 17-1 to 17-$m$ for m vertical lines and signal lines (source line) 18-1 to 18-$n$ for n horizontal lines are arranged in a matrix form on its one substrate. The pixels 11 are arranged at intersecting portions of the gate lines 17-1 to 17-$m$ and the signal lines 18-1 to 18-$n$.

Each of the pixel 11 is comprised of a poly-silicon TFT 19 as a pixel transistor whose gate electrodes are connected to each of the gate lines 17-1 to 17-$m$, and whose source electrodes are connected to each of the signal lines 18-1 to 18-$n$, a liquid crystal cell (liquid crystal capacitor) 20 whose pixel electrode is connected to a drain electrode of the TFT 19, and an auxiliary capacitor 21 which has its one electrode connected to the drain electrode of the TFT 19.

In this pixel structure, the liquid crystal cell 20 works as a capacitor generated between the pixel electrode formed in the TFT 19 and a facing electrode formed corresponding to the pixel electrode. The facing electrode of the liquid crystal cell 20 as well as the other electrode of the auxiliary capacity 21 is connected to a common line 22. To the common line 22 is provided with predetermined direct-current voltage as common voltage VCOM.

Meanwhile, as a method for driving the liquid crystal cell 20, a common inversion driving method for inverting the common voltage VCOM per 1 H (1 horizontal period) is used. By using the common inversion driving method, as the polarity of the common voltage VCOM is inverted per 1 H, the power supply voltage of the horizontal driver 14 for writing the pixel signals to each pixel 11 can be lowered, and this can contribute to lowering the electric power consumption of the whole device.

Figure 2:
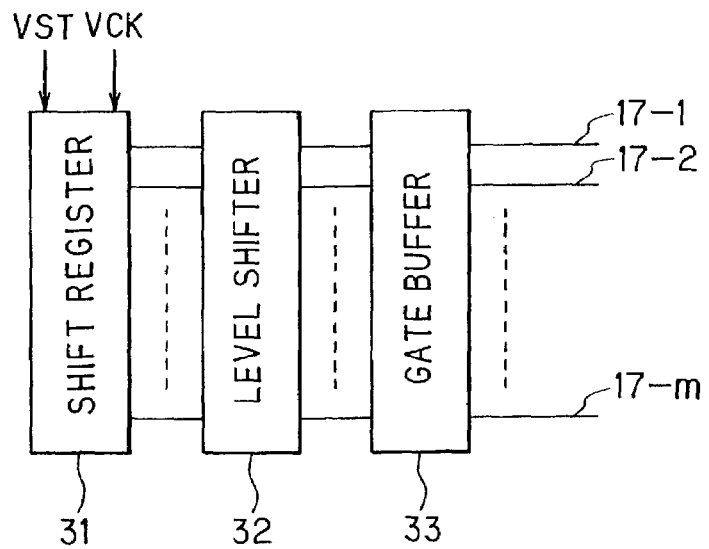
FIG. 2 is a block circuit diagram showing an embodiment of a vertical driver in an active matrix type liquid crystal display device in an analog point sequential driving system.

The vertical driver 13 comprises, for example, a shift register 31, a level shifter 32, and a gate buffer 33, as shown in FIG. 2. When a vertical start pulse VST is inputted in the shift register 31, the shift register 31 sequentially transfers the vertical start pulse VST, synchronized with a vertical clock VCK, to sequentially output it as a shift pulse from each transmission stage.

The level shifter 32 boosts the shift pulse outputted from each transmission stage of the shift register 31 to supply it to the gate buffer 33. The gate buffer 33 sequentially supplies the shift pulse boosted in the level shifter 32 to the gate lines 17-1 to 17-$m$ of the pixel section 12 as a vertical scanning pulse, and performs vertical scanning by selectively driving each pixel 11 of the pixel section 12 on the line basis.

Figure 3:
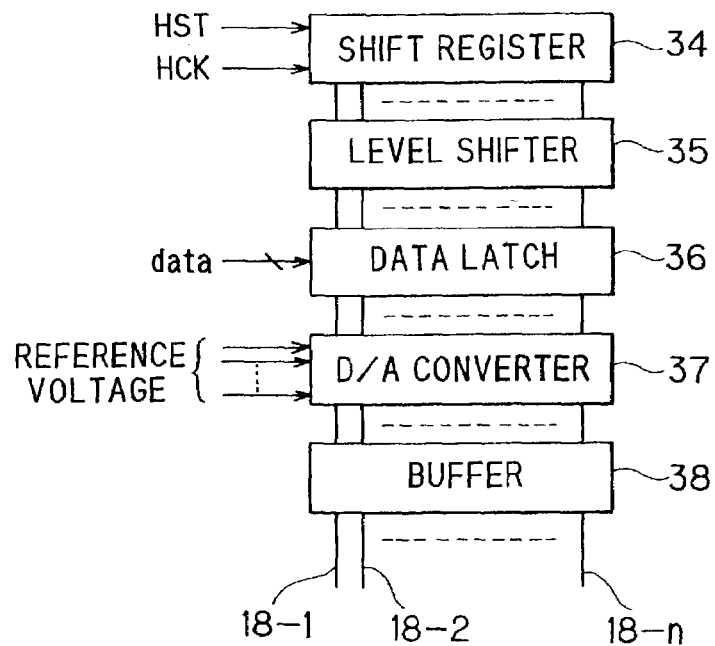
FIG. 3 is a block circuit diagram showing an embodiment of a horizontal driver in the active matrix type liquid crystal display device in the analog point sequential driving system.

The horizontal driver 14 comprises a shift register 34, a level shifter 35, a data latch circuit 36, a D/A converter 37, and a buffer 38, as shown in FIG. 3. When a horizontal start pulse HST is inputted to the shift register 34, the shift register 34 sequentially transfers the horizontal start pulse HST, synchronized with a horizontal clock HCK, to sequentially output it as a shift pulse from each transmission stage and performs horizontal scanning.

The level shifter 35 boosts the shift pulse outputted from each transmission stage of the shift register 34 to supply it to the data latch circuit 36. The data latch circuit 36, in response to the shift pulse supplied from the shift register 34 through the level shifter 35, sequentially latches supplied digital image data "data" of predetermined-bits. The D/A converter 37 is of a reference voltage selection type to convert the digital image data latched in the data latch circuit 36 to an analog image signal and supply it to the signal lines 18-1 to 18-$n$ of the pixel section 12 through the buffer 38.

Also, as shown in FIG. 1, the control system 15 for controlling the vertical driver 13 and the horizontal driver 14 comprises a timing controller (TC) 23, a reference voltage generating source 24, and a DC-DC converter 25. These circuits are mounted on the same substrate, that is, on the LCD panel 16, on which the pixel section 12 is mounted, together with the vertical driver 13 and the horizontal driver 14.

In the control system 15, the timing controller 23 receives power supply voltage VDD from an external power source section (not shown), digital image data "data" from an external CPU (not shown), and a clock CLK from an external clock generator (not shown) respectively through a TCP (tape carrier package), not shown.

Meanwhile, although the CPU, a memory for storing image data and the clock generator are located outside of the LCD panel 16 in the present embodiment, at least one of them may be mounted on the LCD panel 16 as a part of the control system 15.

The timing controller 23 performs timing control to supply the vertical start pulse VST, a clock signal such as the vertical clock VCK, and other kinds of control signals to the vertical driver 13, and also supplies the horizontal start pulse HST, a clock signal such as the horizontal clock HCK, other kinds of control signals, and the digital image data "data" to the horizontal driver 14.

The reference voltage generating source 24 generates a plurality of reference voltages having different voltage values from one another, and supplies the plurality of reference voltage to the D/A converter 37 of the reference voltage selection type of the horizontal driver 14 as its reference voltage. The DC-DC converter 25 converts direct current voltage having low voltage (low voltage) into two or more kinds of high direct current voltage (high voltage) to supply them to each of the circuits such as the vertical driver 13, the horizontal driver 14, and the reference voltage generating source 24.

In the active matrix type liquid crystal display device in the analog point sequential driving system configured as described above, transistors of the vertical driver 13 and the horizontal driver 14 are formed by a TFT, especially a poly-silicon TFT that is the same as the pixel transistor of the pixel section 12, on the same transparent insulating substrate on which the pixel section 12 is mounted and in an area of the transparent insulating substrate whose liquid crystal layer can be sealed by a sealing material. In such a case, in view of the mobility of the poly-silicon, the movement range of the driving frequency of the vertical driver 13 and the horizontal driver 14 is limited to 10 MHz or less.

Among the poly-silicon TFTs used as the pixel transistors of the pixel section 12 and the transistors constituting the driving system, there are one having a bottom gate structure in which the gate electrode is arranged under an oxide film and one having a top gate structure in which the gate electrode is arranged on the oxide film. The cross-sectional structures of these poly-silicon TFTs are shown in FIGS. 4A and 4B.

Figure 4A:
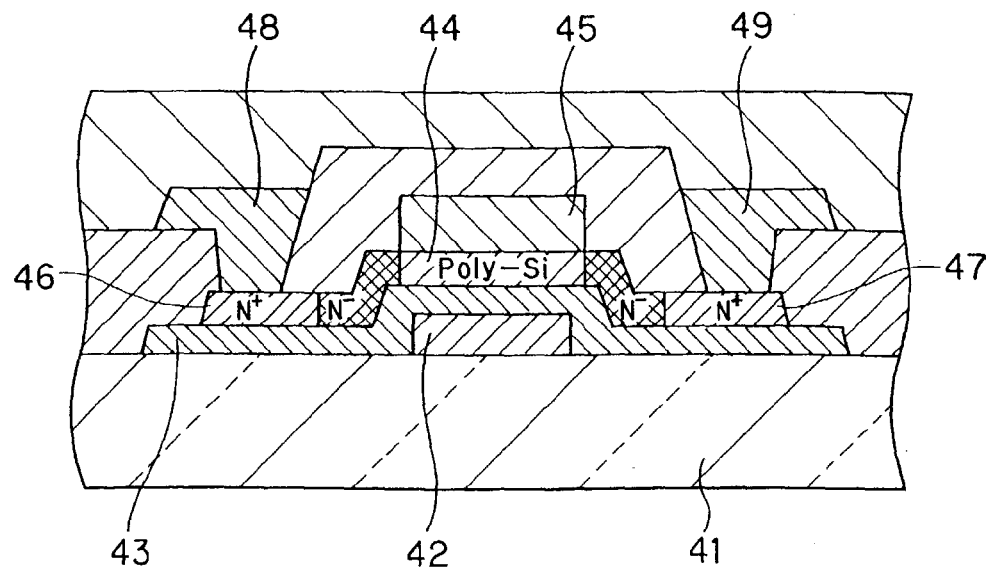
FIGS. 4A and 4B are cross-sectional views showing the structure of the cross sections of a poly-silicon TFT.

The TFT of the bottom gate structure shown in FIG. 4A has a glass substrate 41, and the glass substrate 41 has formed thereon a plurality of gate electrodes 42. Each of the gate electrodes 42 has formed thereon a gate oxide film 43 which bidirectionally extends to the glass substrate 41. The gate oxide film 43 has formed thereon a poly-silicon (Poly-Si) layer 44 upward from the gate electrode 42, and the poly-silicon layer 44 has formed thereon an inter-layer insulating film 45. The gate insulating film 43 has formed thereon at its side portions a source area 46 and a drain area 47 consisting of an N.sup.+ diffusion layer. The source area 46 and the drain area 47 are connected to a source electrode 48 and a drain electrode 49, respectively.

Figure 4B:
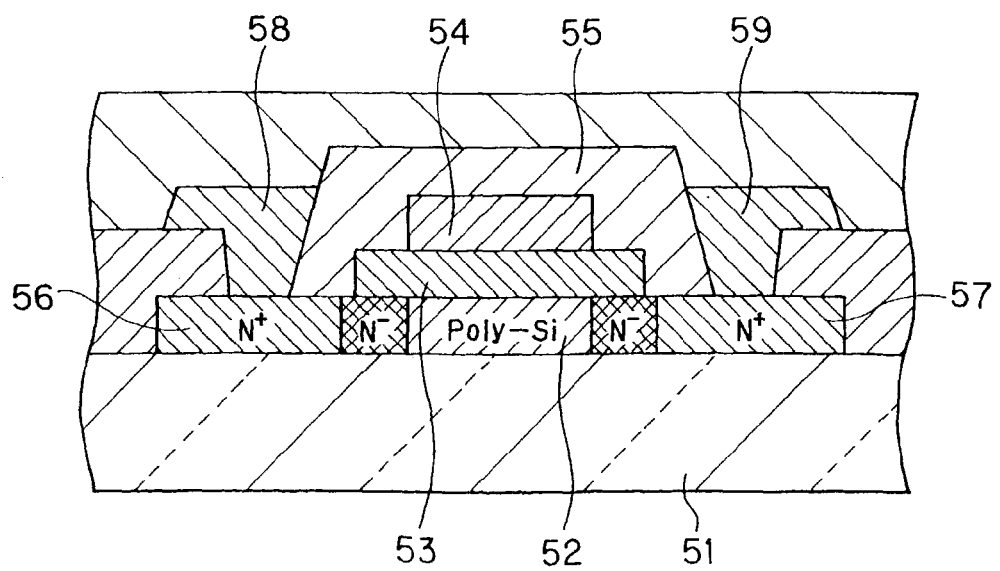

In the TFT of the top gate structure shown in FIG. 4B, a poly-silicon layer 52 is formed on a glass substrate 51, on which a gate electrode 54 is formed via a gate oxide film 53, further on which an inter-layer insulating film 55 is formed. Also, on the glass substrate 51 on the side of the poly-silicon layer 52 are a source area 56 and a drain area 57 consisting of an $N^+$ diffusion layer, to which a source electrode 58 and a drain electrode 59 are respectively connected.

On the other hand, the timing controller 23, the reference voltage generating source 24, and the DC-DC converter 25 of the control system 15 are integrated to be ICs by single crystal silicon. This silicon ICs are mounted by e.g., a COG (chip on glass) method on the same surface for the vertical driver 13 and the horizontal driver 14, that is, the substrate (transparent insulating substrate) on which the drivers 13 and 14 are formed. The silicon IC formed by the single crystal silicon can be driven in 100 MHz.

As described above, as the poly-silicon TFT is used to configure the vertical driver 13 and the horizontal driver 14, that are the circuits which drive at low speed and have significant characteristics dispersion, the circuits using the poly-silicon TFT are sealed in a closed space of the pixel section 12. Thus, mixing of $Na^+$ ion, etc. causing the Vth (voltage at a threshold value) of the TFT can be prevented, which increases the reliability. In this case, as for an aspect of the thickness of the liquid crystal display device, the TFT is thin enough to be able to be ignored, compared with the liquid crystal cell (liquid crystal layer). Thus, it cannot be a cause to increase the thickness of the liquid crystal display device itself.

On the other hand, the circuits which drive at high speed and have small characteristics dispersion, that is, the timing controller 23, the reference voltage generating source 24, and the DC-DC converter 25 of the control system 15 are integrated to be ICs by single crystal silicon, and are mounted on the same surface on which the vertical driver 13 and the horizontal driver 14 are formed. The cross-sectional view of this case is shown in FIG. 5.

Figure 5:
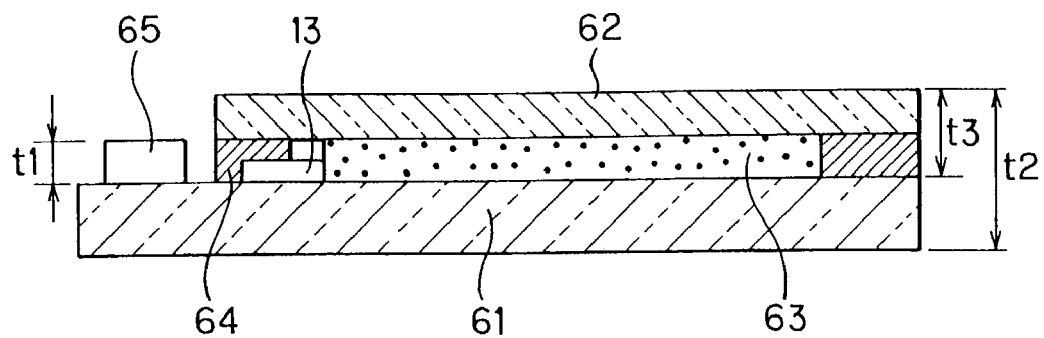
FIG. 5 is a cross-sectional view showing a liquid crystal display device according to the present invention.

In FIG. 5, the liquid crystal display device includes a transparent insulating substrate 61 which has formed thereon the vertical driver 13 and so on, a transparent insulating substrate (facing substrate) 62 which faces the transparent insulating substrate 61, and a liquid crystal layer 63 held therebetween and sealed by a sealing material 64, as described above. In the liquid crystal display device, an IC chip 65 into which the control system 15 is integrated is mounted by the COG method on the transparent insulating substrate 61 on which the vertical driver 13 and so on are mounted.

Figure 6:
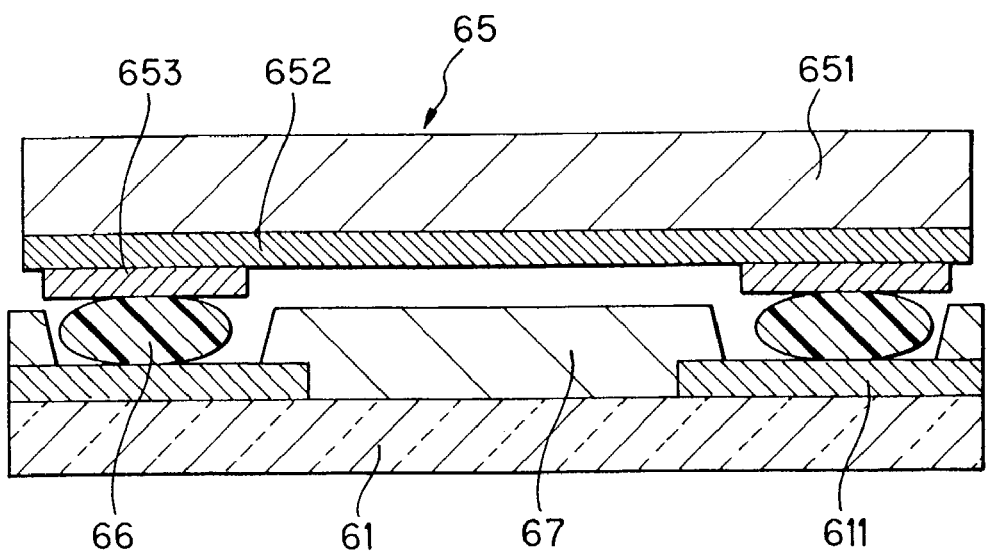
FIG. 6 shows a structure of an electric connection part between a circuit portion on a transparent insulating substrate and an IC chip.

FIG. 6 shows a structure of an electric connection part between the circuit portion on the transparent insulating substrate 61 and the IC chip 65. In FIG. 6, as for the IC chip 65, a circuit portion 652 is formed on a silicon substrate 651, and the circuit portion 652 is electrically connected to an external connection terminal (bump material) 653. The external connection terminal 653 is electrically connected with a circuit wiring such as an aluminum wiring 611 on the transparent insulating substrate 61 via an anisotropic conducting film 66. Also, an interlayer insulating film 67 exists between the transparent insulating substrate 61 and the IC chip 65.

When the IC chip 65 is mounted on the transparent insulating substrate 61 as such, the IC chip 65 itself does not have a problem with respect to its reliability since a protective layer is formed on a silicon IC at the time of preparing the IC. Meanwhile, as it is in the COG structure, it is necessary to increase the reliability to a metal material of the connection portion with the transparent insulating substrate 61. To do this, after the IC chip 65 is formed on the transparent insulating substrate 61, a protective layer may be formed by silicon resin so that it may cover the IC chip 65 and the substrate 61.

In the mounting structure described above, the IC chip 65 is formed so that its thickness t1 (about 0.7 mm) should be the thickness t3 of the facing transparent insulating substrate 62 and the sealing material 64 or thinner. Thus, since the thickness t2 of the whole liquid crystal display device does not depend on the thickness t3 of the IC chip 65, it is possible to reduce the thickness of the liquid crystal display device. That is, the entire thickness t2 of the transparent insulating substrate 61, the transparent insulating substrate 62, and the sealing material 64 is the thickness of the liquid crystal display device itself.

Also, as the peripheral circuits are integrated on chips, and the IC chip 65 is mounted on the transparent insulating substrate 61, the portions to be electrically connected to the external circuits of the LCD panel 16 can be reduced. Thus, it is possible to improve the reliability toward mechanical vibration of the LCD panel 16, and to refrain from generating the defection of electric connection in the manufacturing process.

Meanwhile, in mounting the modules, the mechanical strength of the IC chip 65 mounted by the COG method tends to be lower than the adhesive strength of the portion forming the liquid crystal cell of the pixel section 12. To cope with it, by setting the thickness t1 of the IC chip 65 to be the total thickness t3 of the transparent insulating substrate 62 and the sealing material 64 or thinner, preferably thinner than the thickness t3 the IC chip 65 can be configured so that it is rarely forced from outside.

Also, in the liquid crystal display device according to the present embodiment, to lose the weight of the device itself in addition to reducing the thickness of the device itself, organic materials such as PET (poluethylene telephtalete), PES (polyethersulfone), and so on are used as substrate materials for the transparent insulating substrates 61 and 62.

As the combination of the substrate materials for the transparent insulating substrates 61 and 62, there may be four cases in the following. In case 1, silicon oxide is used as the substrate materials for both of the transparent insulating substrates 61 and 62. In case 2, silicon oxide is used as the substrate material for the transparent insulating substrate 61, and the organic material such as PET, PES, or the like is used as the substrate material for the transparent insulating substrate 62. In case 3, the organic material such as PET, PES, or the like is used as the substrate materials for both of the transparent insulating substrates 61 and 62. In case 4, the organic material such as PET, PES, or the like is used as the substrate material for the transparent insulating substrate 61, and silicon oxide is used as the substrate material for the transparent insulating substrate 62.

Among the combinations of the substrate materials in the case 1 to case 4, the combination in the case 3, in which the organic material such as PET, PES, or the like is used as the substrate materials for both of the transparent insulating substrates 61 and 62, is the most effective to reduce the thickness and lose the weight of the liquid crystal display device itself because the materials are extremely light in weight.

Although the explanation has been made on the embodiment in which the present invention is applied to the active matrix type liquid crystal display device in the analog point sequential driving system, the present invention is not limited to it, but can be applied to an active matrix type liquid crystal display device in a time-division driving system (selector system) described in the following.

Figure 7:
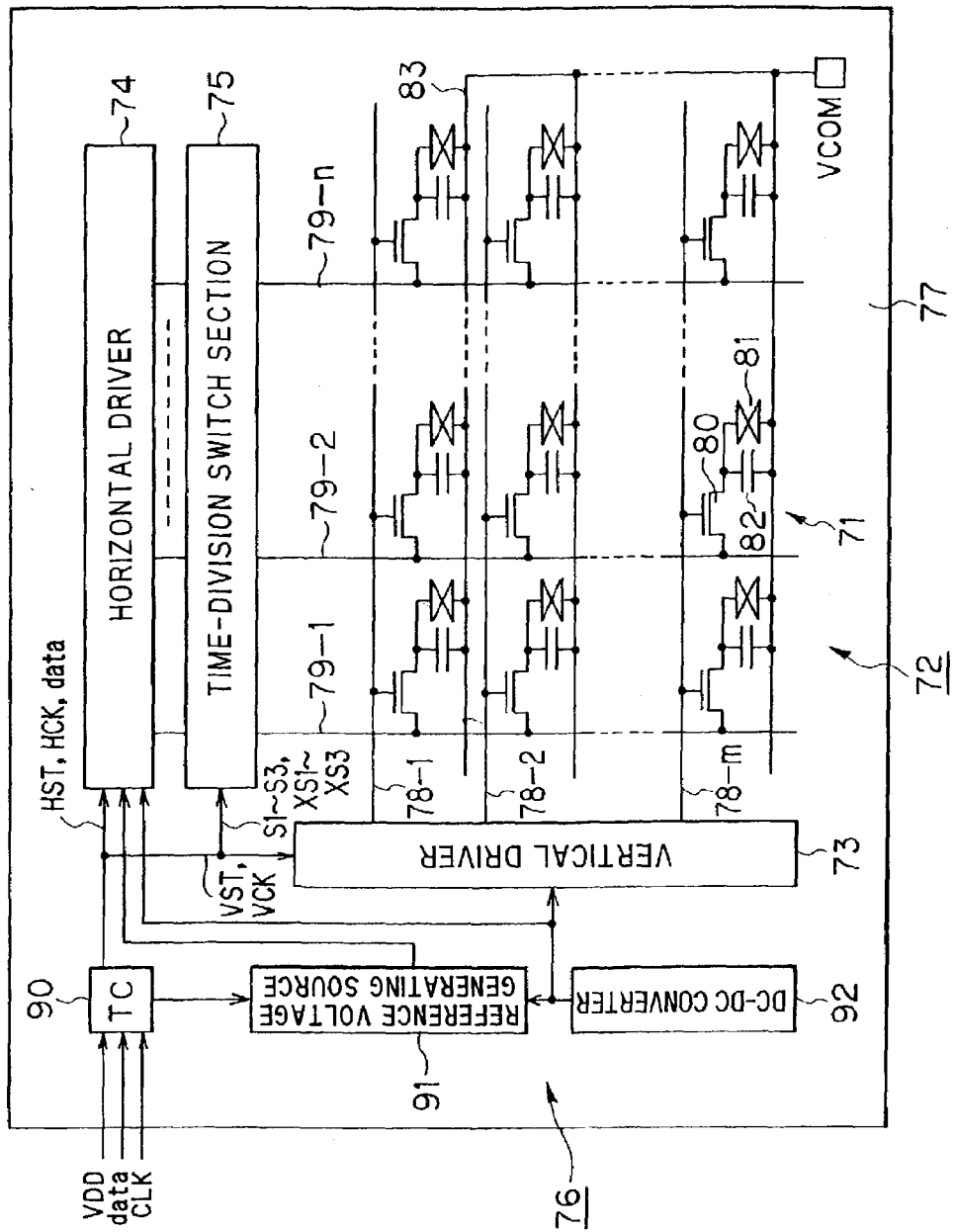
FIG. 7 is a block diagram showing an active matrix type liquid crystal display device in a time-division driving system to which the present invention is applied.

FIG. 7 is a schematic view showing a configuration example of an active matrix type liquid crystal display device in a time-division driving system to which the present invention is applied.

In FIG. 7, the active matrix type liquid crystal display device in the time-division driving system has a configuration in which a pixel section 72 structured by arranging a number of pixels 71 in a matrix form, a vertical driver 73 which sequentially selects each of the pixels 71 of the pixel section 72 for each line, a horizontal driver 74 which writes pixel signals on each pixel 71 selected for each line, a time-division switch section 75 for time-division driving, and a control system 76 which controls the drivers 73 and 74 and the time-division switch section 75 are mounted on an LCD panel 77.

Each of the pixel 71 is comprised of a poly-silicon TFT 80 in which its gate electrode is connected to each of the gate lines 78-1 to 78-m, and its source electrode is connected to each of the signal lines 79-1 to 79-n, a liquid crystal cell 81 connected at a pixel electrode to a drain electrode of the TFT 80, and an auxiliary capacity 82 connected at one electrode to the drain electrode of the TFT 80. The facing electrode of the liquid crystal cell 81 is connected to a common line 83, as well as the other electrode of the auxiliary capacity 82. To the common line 83 is provided with predetermined direct-current voltage as common voltage VCOM.

The time-division driving system will be explained herein. The time-division driving system is a driving system in which a plurality of signal lines in the pixel section 72 adjacent to one another are divided into 1 unit (block), signal voltage supplied to the plurality of signal lines within the divided 1 block is outputted in time series from each of the output terminal of the horizontal driver 74, the time-division switch section 75 is provided with the plurality of signal lines being 1 unit, and the time-division switch section 75 time-divisionally samples the time-series signal voltage outputted from the horizontal driver 74 to sequentially supply it to each of the plurality of signal lines.

To implement the time-division driving, the horizontal driver 74 outputs signal voltage to the plurality of signal lines in time series, with the plurality of signal lines being 1 unit. One example of the configuration of the horizontal driver 74 is shown in FIG. 8.

Figure 8:
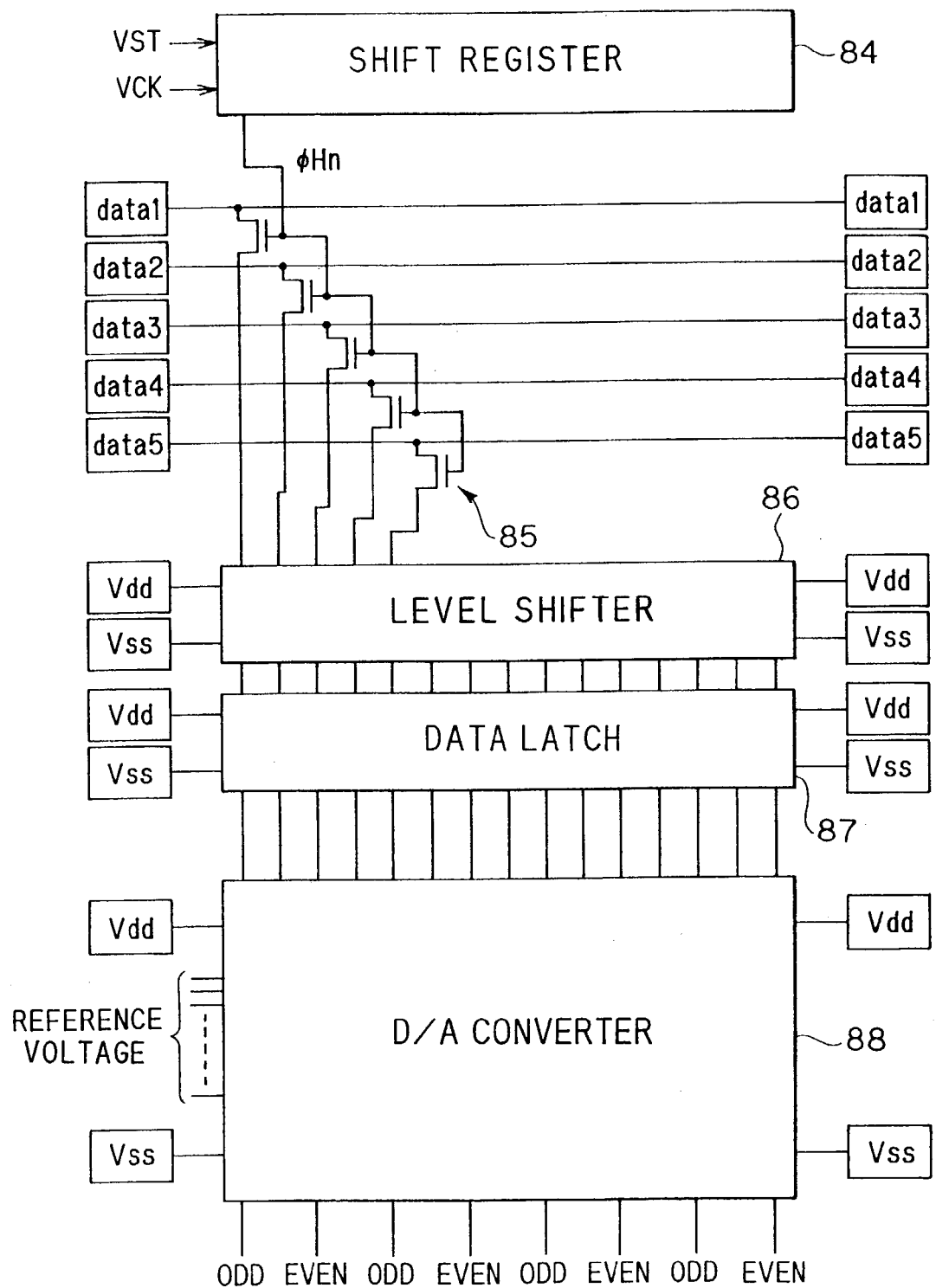
FIG. 8 is a block circuit diagram showing an embodiment of a horizontal driver in the active matrix type liquid crystal display device in the time-division driving system.

The horizontal driver 74 comprises a shift register 84, a set of sampling switches 85, a level shifter 86, a data latch circuit 87, and a D/A converter 88, as shown in FIG. 8. In the present embodiment, the horizontal driver 74 takes in 5-bit digital image data, data 1 to data 5, and power supply voltage Vdd, Vss from both sides in a shift direction of the shift register 84.

In the horizontal driver 74 configured as in FIG. 8, When a horizontal start pulse HST is inputted in the shift register 84, the shift register 84 sequentially transmits the horizontal start pulse HST, synchronized with a horizontal clock HCK, to sequentially output it as a shift pulse from each transmission stage and performs horizontal scanning. Each of the sampling switches in the set of sampling switches 85 sequentially sample the inputted digital image data, data 1 to data 5, in response to the shift pulse (sampling pulse) sequentially outputted from the shift register 84.

The level shifter 86 boosts, for example, the 5V digital data sampled in the set of sampling switches 85 into digital data of liquid crystal driving voltage. The data latch circuit 87 is a memory for storing the digital data boosted in the level shifter 86 for 1 H. The D/A converter 88 adopts a constitution of a reference voltage selection type to convert the digital image data for 1 H outputted from the data latch circuit 87 to an analog image signal for output.

Meanwhile, as the horizontal driver 74, one in a column inversion driving method is used. To implement the column inversion driving, the horizontal driver 74 outputs signal voltage whose potential is inverted at each output terminal depending on whether it is odd or even, and inverts the polarity of the signal voltage at every field. The column inversion driving method is a driving method in which the pixels adjacent to one another in a vertical direction has the same polarity, and the state of the pixel polarity is inverted at every field. It is noted that the horizontal driver 74 can cope with a 1 H common (VCOM) inversion driving.

Figure 9:
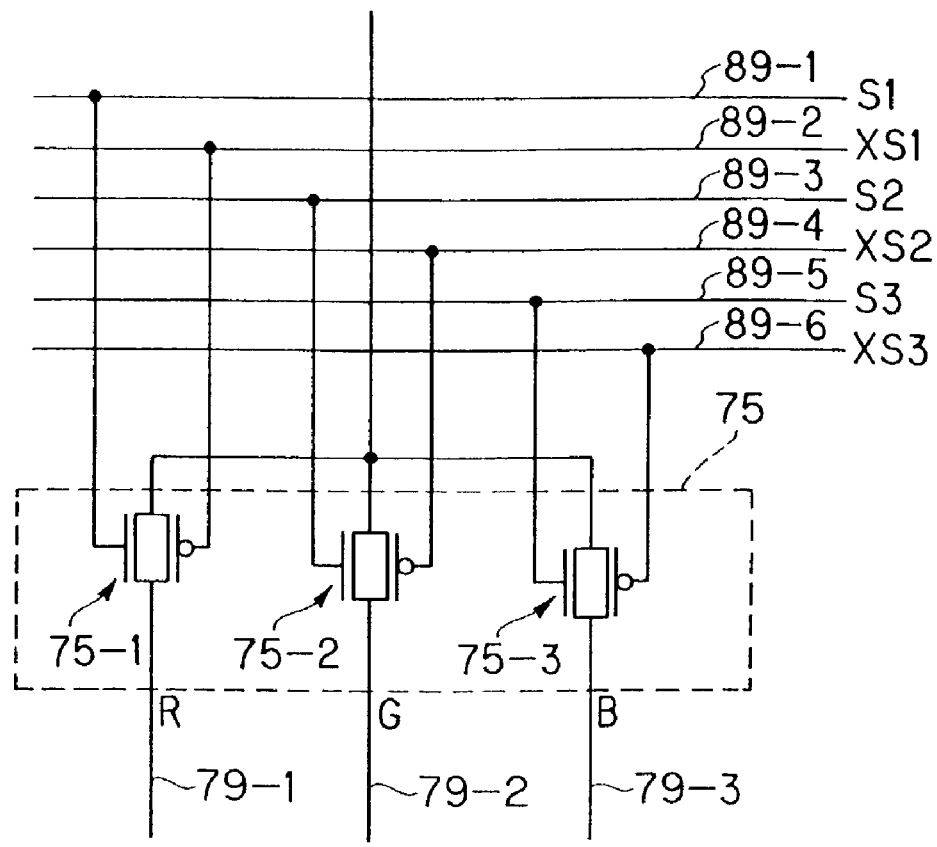
FIG. 9 is a circuit diagram showing an embodiment of a time-division switch section.

On the other hand, the time-division switch section 75 is configured by analog switches (transmission switches) which time-divisionally sample the time-series signal voltage outputted from the horizontal driver 74. An example of a concrete configuration of the time-division switch section 75 is shown in FIG. 9. It is noted that the time-division switch section 75 is provided for each output of the horizontal driver 74. In this example, a three-timing division driving is performed in correspondence with R (red), G (green), and B (blue).

The time-division switch section 75 is constituted by analog switches 75-1, 75-2, and 75-3 in a CMOS configuration in which a PchMOS transistor and a NchNOS transistor are connected in series. Meanwhile, although the switches in the CMOS configuration are used as the analog switches 75-1, 75-2, and 75-3 in this example, the ones in a PMOS or NMOS configuration may also be used.

In the time-division switch section 75, the input terminals of the three analog switches 75-1, 75-2, and 75-3 are connected in common, and each of the output terminals are connected to one terminal of each of the three signal lines 79-1, 79-2, and 79-3. To each input terminal of the signal lines 79-1, 79-2, and 79-3 is supplied signal potential outputted in time series from the horizontal driver 74.

Also, six control lines 89-1 to 89-6 in total are wired, two per one analog switch. Two control input terminals of the analog switch 75-1, that is, gates of the CMOS transistors, are connected to the control lines 89-1 and 89-2, two control input terminals of the analog switch 75-2 are connected to the control lines 89-3 and 89-4, and two control input terminals of the analog switch 75-3 are connected to the control lines 89-5 and 89-6, respectively.

To the six control lines 89-1 to 89-6 are supplied gate selection signals S1 to S3, XS1 to XS3 for sequentially selecting the three analog switches 75-1, 75-2, and 75-3 from a timing controller (TC) 90 (refer to FIG. 7) described later. The gate selection signals XS1 to XS3 are inversion signals of the gate selection signals S1 to S3.

The gate selection signals S1 to S3, XS1 to XS3 sequentially switch on the three analog switches 75-1, 75-2, and 75-3, synchronized with the time-series signal potential outputted from the horizontal driver 74. Accordingly, the three analog switches 75-1, 75-2, and 75-3 sample the time-series signal potential outputted from the horizontal driver 74 into three-timing divisions for 1H period, and supply them to corresponding signal lines 79-1, 79-2, and 79-3, respectively.

In FIG. 7 again, the control system 76 which controls the drivers 73 and 74 and the time-division switch section 75 includes the timing controller (TC) 90, a reference voltage generating source 91, and a DC-DC converter 92, and these circuits are mounted on the same substrate on which the pixel section 72 is mounted, that is, the LCD panel 77, together with the drivers 73 and 74 and the time-division switch section 75.

In the control system 76, to the timing controller 90 are inputted power supply voltage VDD from an external power source section (not shown), digital image data "data" from an external CPU (not shown), and a clock CLK from an external clock generator (not shown) respectively through a TCP (not shown).

Meanwhile, although the CPU, a memory for storing image data, or the clock generator are provided outside of the LCD panel 77 in the present embodiment, at least one of them may be a part of the control system 76, integrated into a single crystal silicon IC (COG), and mounted on the LCD panel 77.

Also, other than the CPU, a memory for storing image data, or the clock generator, at least one of a variety of control circuits such as a light source control circuit for an LCD, a graphic controller for displaying the LCD (or EL), and further a transceiver circuit, a battery control circuit, etc. in a case of using the present display device as a display section of, e.g., a portable telephone as will be described later may be integrated to be a single crystal silicon IC as a part of the control system 76 and mounted on the LCD panel 77.

The light source control circuit for an LCD is a circuit for controlling a back light or a front light of the LCD, and does not supply power to a light source (light emitting diode, fluorescence display tube) at the time of a standby state of the portable telephone, but supplies power at the time of an input operation of the portable telephone. The graphic controller for displaying the LCD (or EL) is a circuit for converting image data supplied from the transceiver circuit into an image format so that the image data can be displayed in the image area of the LCD or the EL, converts into a display format of 160 pixels in a horizontal direction×160 pixels in a vertical direction.

The transceiver circuit is one for transmission, which receives digital signals and analog signals transmitted as electromagnetic wave and converts them to digital signals and analog signals as electric signals for output. The battery control circuit automatically lowers the operations of the clocks of the CPU, the LCD (or EL) panel, the graphic controller after a predetermined time period to lower the power consumption. Meanwhile, when the display device is used as a display section of the portable telephone, the CPU also has a function to convert inputted information at the time of operating buttons in a case of the portable telephone into digital data.

The timing controller 90 controls the timing, and supplies the vertical start pulse VST, a clock signal such as the vertical clock VCK, and other kinds of control signals to the vertical driver 73, also supplies the horizontal start pulse HST, a clock signal such as the horizontal clock HCK, other kinds of control signals, and the digital image data "data" to the horizontal driver 74, and also supplies the aforementioned fate selection signals S1 to S3, XS1 to XS3 to the time-division switch section 75, respectively.

The reference voltage generating source 91 generates a plurality of reference voltage having different voltage values to one another, and supplies the plurality of reference voltage to the D/A converter 87 of the reference voltage selection type of the horizontal driver 74 as its reference voltage. The DC-DC converter 92 converts direct current voltage having low voltage (low voltage) into more than two kinds of high direct current voltage (high voltage) to supply them to each of the circuits such as the vertical driver 73, the horizontal driver 74, the reference voltage generating source 91, and so on.

In the active matrix type liquid crystal display device in the time-division driving system configured as above, transistors included in the vertical driver 13 and the horizontal driver 14 and each of the analog switches consisting of the time-division switch section 75 are formed by a TFT, especially a poly-silicon TFT that is the same as the pixel transistor of the pixel section 72, on the same transparent insulating substrate on which the pixel section 72 is mounted and in an area in which the liquid crystal layer is sealed by a sealing material.

On the other hand, the timing controller 90, the reference voltage generating source 91, and the DC-DC converter 92 of the control system 76 are integrated to be ICs by single crystal silicon. This silicon ICs are mounted by e.g., a COG method on the same surface of the vertical driver 73 and the horizontal driver 74, that is, the substrate on which the drivers 73 and 74 are formed.

As described above, while the poly-silicon TFT is used to configure the vertical driver 73, the horizontal driver 74, and the time-division switch section 75, that are the circuits which drive at low speed and have significant characteristics dispersion, the circuits which drive at high speed or the circuits which have small characteristics dispersion, that is, the timing controller 90, the reference voltage generating source 91, and the DC-DC converter 92 of the control system 76 are integrated to be ICs by single crystal silicon, and are mounted on the same surface on which the vertical driver 73 and the horizontal driver 74 are formed. Thus, the display device can obtain similar effects as the active matrix type liquid crystal display device in the analog point sequential driving system does.

Figure 10:
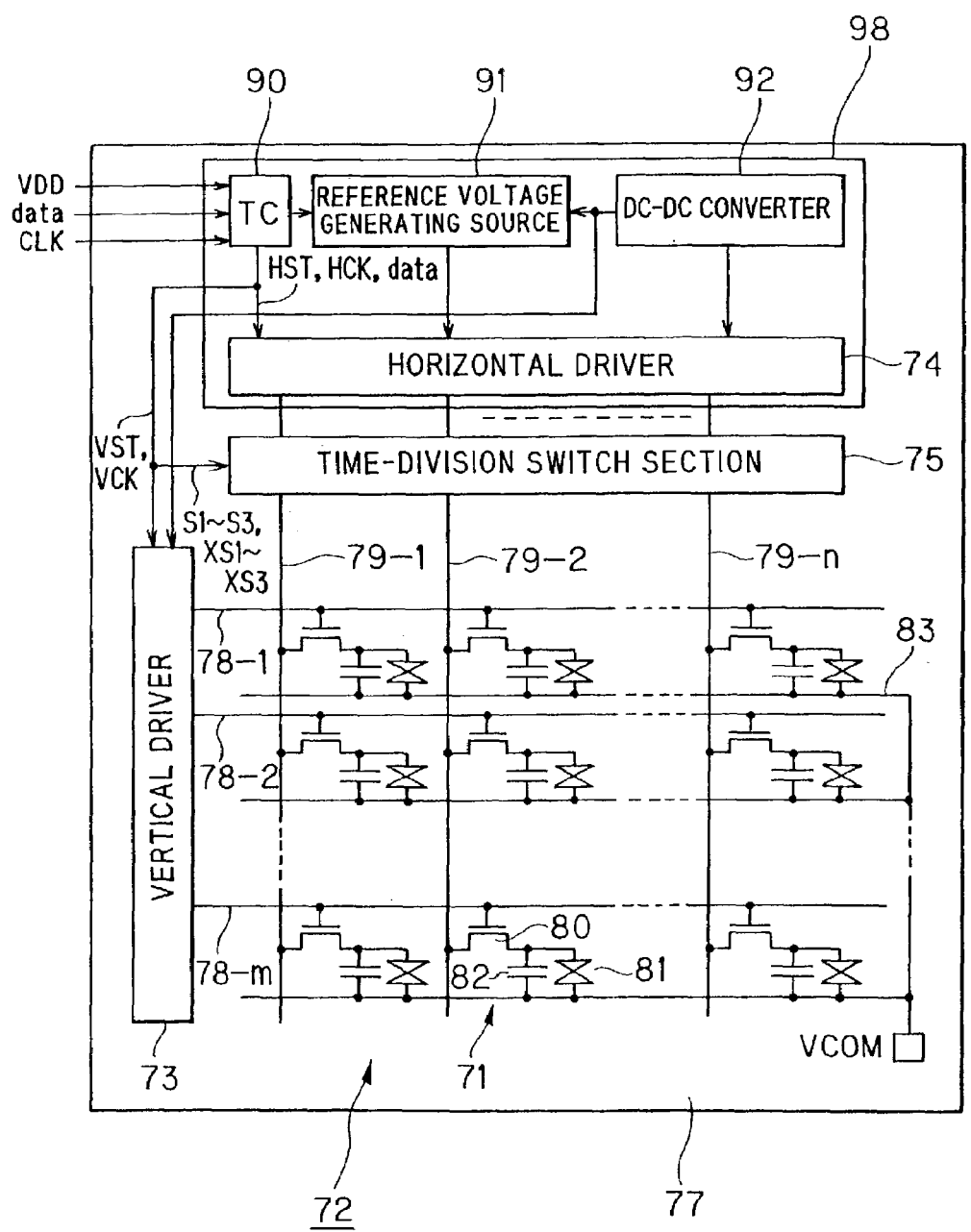
FIG. 10 is a block circuit diagram showing another embodiment of the liquid crystal display device to which the present invention is applied.

Meanwhile, although the timing controller 90, the reference voltage generating source 91, and the DC-DC converter 92 are mounted on the side of the vertical driver 2 in the present embodiment, the timing controller 90, the reference voltage generating source 91, and the DC-DC converter 92 may be integrated to be a single crystal silicon IC (COG) 98, integrally with the horizontal driver 74, and the IC 98 may be mounted on the LCD panel 77, as shown in FIG. 10.

With this embodiment, the area for the space occupied by the timing controller 90, the reference voltage generating source 91, and the DC-DC converter 92 becomes unnecessary on the side of the vertical driver 72, and thus the frame width of the LCD panel 77 in a horizontal direction can be reduced for the occupied area. Thus, this is useful when this embodiment is applied to a display device having a specification in which the frame width in a horizontal direction is desired to be reduced.

In such a case, it is apparent that, other than the CPU, the memory for storing image data, or the clock generator, at least one of a variety of control circuits such as the light source control circuit for the LCD, the graphic controller for displaying the LCD (or EL), the transceiver circuit for a telephone, and the battery control circuit, etc. may be integrated to be a single crystal silicon IC, integrally with the horizontal driver 74.

Also, although each of the aforementioned embodiments have been explained by exemplifying the case in which the present invention is applied to an active matrix type liquid crystal display device which uses a liquid crystal as a material having electro-optical effects, the present invention can also be applied to other active matrix type liquid crystal display devices such as an EL display device which uses electroluminescence (EL).

The display device according to the present invention is applicable to a display section of a portable terminal device such as a portable telephone, a PDA (personal digital assistant), etc. whose thickness is attempted to be thin, as well as to a display of an OA device such as a personal computer, a word processor, etc. and a television receiver.

Figure 11:
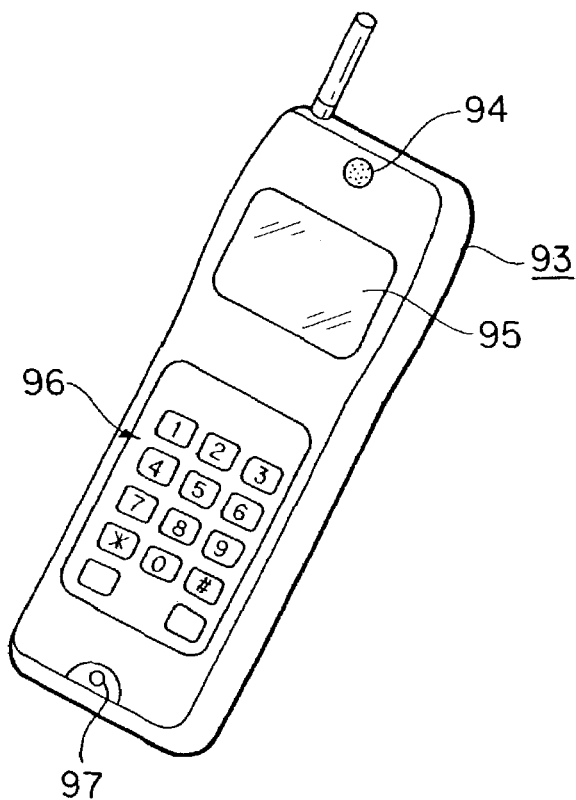
FIG. 11 is a perspective view showing an outward appearance of a portable telephone according to the present invention.
Figure 12:
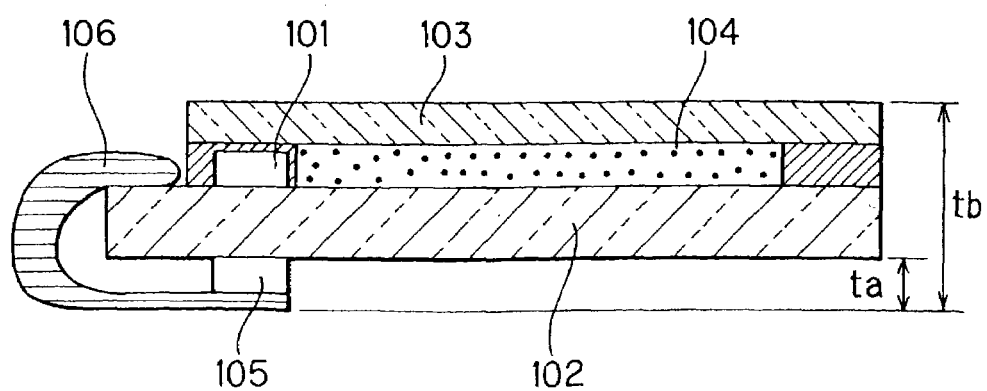
FIG. 12 is a cross-sectional view showing a conventional liquid crystal display device.

FIG. 11 is a perspective view showing an outward appearance of a portable terminal device to which the present invention is applied, for example, a portable telephone.

The portable telephone of the present embodiment is constituted by arranging a speaker 94, a display section 95, an operation section 96, and a microphone 97 in order from the upper portion at the front surface of a device casing 93. In the portable telephone constituted as such, a liquid crystal display device, for example, is used for the display section 95, and the above-mentioned liquid crystal display device according to the present invention is used as this liquid crystal display device.

Accordingly, as the liquid crystal display device according to the present invention is used as the display section 95 in the portable terminal device such as the portable telephone, the liquid crystal display device has an advantage of being able to contribute to reducing the thickness of the portable terminal device itself since it is configured to be able to reduce the thickness of the portable terminal device itself.

INDUSTRIAL APPLICABILITY

As described above, in the display device according to the present invention, since the semiconductor chip, as the control system for controlling the driving system, is formed on the substrate on which the driving system is formed, the thickness of the whole display device does not depend on the thickness of the semiconductor chip. Thus, it can be realized to reduce the thickness of the whole display device and also to reduce the thickness of the portable terminal device that uses the device as a display section.

The invention claimed is:

1. A display device comprising:
a first substrate; a material layer; and a second substrate,
wherein a pixel section, a driving system, and a control system are disposed on a same surface of said first substrate,
wherein said control system includes at least one of a reference voltage generating source and a DC-DC converter,
wherein said control system includes said DC-DC converter,
wherein said DC-DC converter converts a low direct current voltage into high direct current voltages for said driving system, and
wherein said material layer is between said first substrate and second substrate.

2. The display device according to claim 1 wherein a sealing material is between said first substrate and second substrate, said sealing material enclosing said driving system and said material layer.

3. The display device according to claim 1 wherein a time-division switch section is on said first substrate.

4. The display device according to claim 1 wherein said first substrate is transparent substrate.

5. The display device according to claim 1 wherein said second substrate is transparent substrate.

6. The display device according to claim 1 wherein wiring is on said first substrate, an external connection terminal electrically connecting said control system to said wiring.

7. The display device according to claim 1 wherein said control system is a semiconductor chip.

8. The display device according to claim 1 wherein said control system includes a timing controller.

9. The display device according to claim 8 wherein said timing controller provides timing control to said driving system.

10. The display device according to claim 1 wherein said control system includes said reference voltage generating source.

11. The display device according to claim 10 wherein said reference voltage generating source generates a plurality of reference voltages having different voltage values from one another.

12. The display device according to claim 1 wherein the thickness of said control system is set to be not larger than a thickness summing the thickness of the sealing material and the thickness of the second substrate.

13. The display device according to claim 1 wherein said material layer generates electro-optical effects.

14. The display device according to claim 1 wherein said material layer is a liquid crystal layer.

15. The display device according to claim 1 wherein said material layer is an electroluminescence layer.

16. The display device according to claim 1, wherein said pixel section has a plurality of pixels arranged in a matrix form, said driving system writes pixel signals to said pixel section, and said a control system controls said driving system.

17. The display device according to claim 1 wherein said driving system includes a horizontal driver and a vertical driver.

18. The display device according to claim 17 wherein said horizontal driver includes a shift register, a level shifter, a data latch circuit, a D/A converter, and a buffer.

19. The display device according to claim 1 wherein said vertical driver includes a shift register, a level shifter, and a gate buffer.

20. The display device according to claim 1 wherein the thickness of said driving system is set to be not larger than a thickness summing the thickness of the sealing material and the thickness of the second substrate.

21. A portable terminal device using the display device according to claim 1 as a display section.

* * * * *

UNITED STATES PATENT AND TRADEMARK OFFICE
CERTIFICATE OF CORRECTION

| | | |
|---|---|---|
| PATENT NO. | : 7,193,677 B2 | Page 1 of 1 |
| APPLICATION NO. | : 10/049052 | |
| DATED | : March 20, 2007 | |
| INVENTOR(S) | : Masumitsu Ino | |

It is certified that error appears in the above-identified patent and that said Letters Patent is hereby corrected as shown below:

Column 12, Line 56:
"according to claim 1" should read -- according to claim 17 --.

Signed and Sealed this

Seventh Day of August, 2007

JON W. DUDAS
*Director of the United States Patent and Trademark Office*